March 3, 1953 — D. F. PRZYBYLSKI — 2,629,945
EXCAVATING SHOVEL DIGGING TEETH ARRANGEMENT
Filed Jan. 27, 1949 — 2 SHEETS—SHEET 1
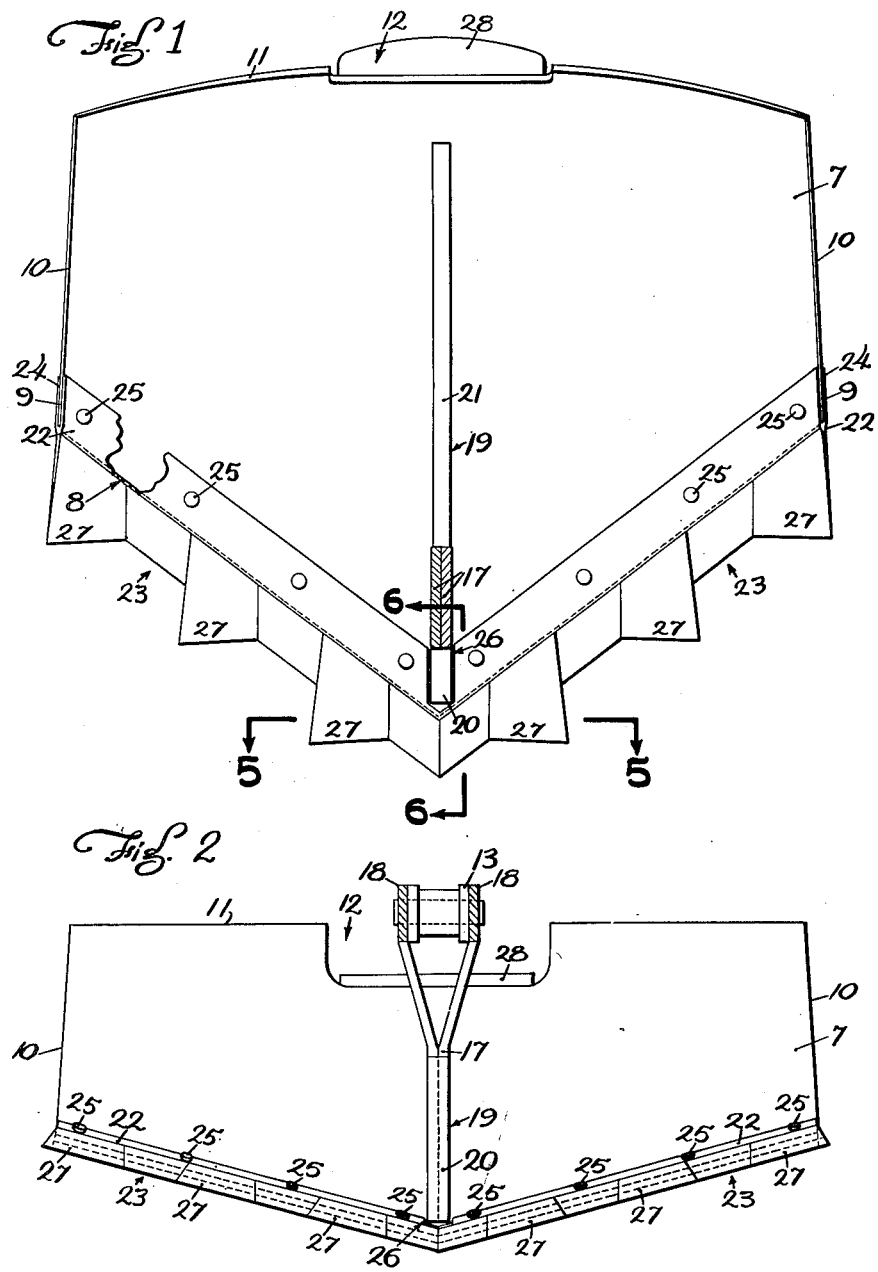
INVENTOR.
Daniel F. Przybylski
BY Harry D. Kilgore
Attorney March 3, 1953 D. F. PRZYBYLSKI 2,629,945
EXCAVATING SHOVEL DIGGING TEETH ARRANGEMENT
Filed Jan. 27, 1949 2 SHEETS—SHEET 2
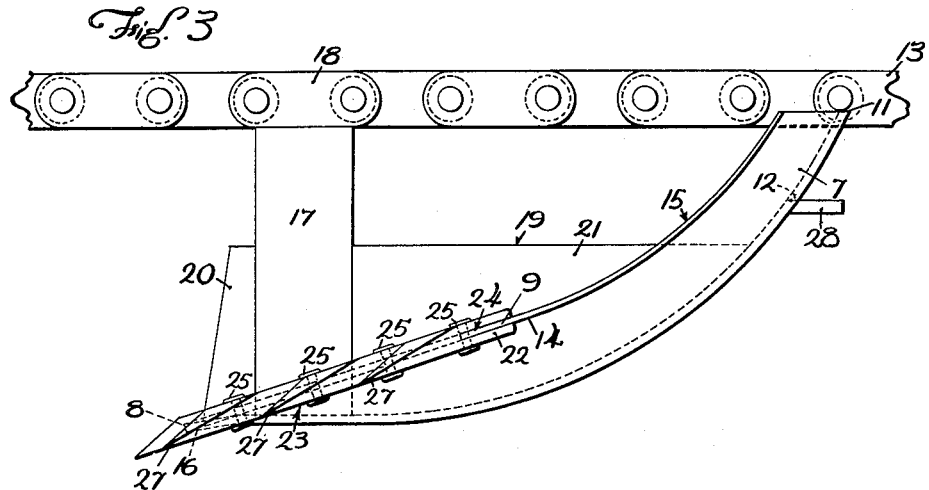
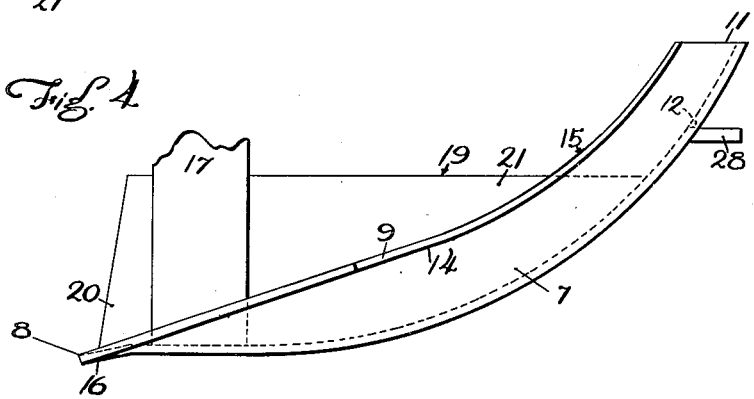
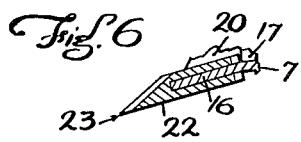
INVENTOR.
Daniel F. Przybylski
BY Harry D. Kilgore
Attorney Patented Mar. 3, 1953

2,629,945

UNITED STATES PATENT OFFICE 2,629,945

EXCAVATING SHOVEL DIGGING TEETH ARRANGEMENT

Daniel F. Przybylski, Winona, Minn.

Application January 27, 1949, Serial No. 73,093

1 Claim. (Cl. 37—141)

My present invention relates to improvements in shovels, and, more particularly, to a shovel for a trench excavator in which a plurality of shovels are attached equidistances apart, to a driven conveyor chain that travels an endless course, during which the shovels are successively moved from digging and loading position to dumping position, and returned to the first noted position.

The object of this invention is to provide an excavator shovel having a novel body and cutting and digging blades that are detachably applied to the body.

To the above end, the invention consists of the novel construction and arrangement hereinafter described and defined in the claim.

In the accompanying drawings, which illustrate the invention, like characters indicate like parts throughout the several views.

Referring to the drawings:

Fig. 1 is a plan view of the improved shovel with the exception that the attaching post is sectioned;

Fig. 2 is a front elevational view of the same;

Fig. 3 is a side elevational view;

Fig. 4 is a view corresponding to Fig. 3, with the exception that the blades have been removed and the upper portion of the post broken away;

Fig. 5 is a fragmentary detail view in transverse vertical section taken on the line 5—5 of Fig. 1, on an enlarged scale; and Fig. 6 is a fragmentary detail view principally in longitudinal vertical section taken on the line 6—6 of Fig. 1.

The body 7 of the shovel is formed of a single sheet of metal. This body 7 at its front edge 8 is in the form of a wide V. The longitudinal side edges of said body, for a short distance from the outer corners of said front edge are parallel, as indicated at 9, and from thence to the rear end of the body 7 said longitudinal edges are in slightly converging relation, as indicated at 10. The rear edge 11 of the body 7 is straight and formed therein, at its longitudinal center, is a clearance notch 12 for a sprocket chain 13 to which the shovel is attached.

The body 7, at its front transverse portion 14, is flat, and longitudinally and rearwardly thereof said body is on the arc of a circle, as indicated at 15. The extreme front portion of the body 7, forwardly of its flat portion 14, is slightly downwardly inclined, as indicated at 16. This inclined portion 16 has its greatest inclination at the point of the front edge of the body 7 and from thence progressively decreases to the corners of said front edge, see Fig. 6.

The shovel is secured to the sprocket chain 13 by a short post 17 rigidly secured to the body 7 at its transverse center. This post 17 comprises a pair of flat connected plates in opposing relation with their upper end portions in diverging relation and having terminals in the form of a pair of outside parallel bars 18. These bars 18 form one of the links of the chain 13. Only a fragment of the sprocket chain 13 is shown and it may be here stated that said chain is endless and runs over an upper driven sprocket wheel and a lower idle sprocket wheel on a boom, not shown. The shovel is only one of a plurality of similar shovels which will be attached to the sprocket chain 13 equi-distantly apart.

Extending longitudinally in the shovel in the vertical plane of the post 17 is a reinforcing plate 19 comprising a short section 20 forward of the post 17 and a long section 21 rearwardly of said post. The lower longitudinal edge of the plate 19 is shaped to fit the contour of the body 7 and is rigidly secured thereto and to the post 17.

The body 7 is provided with a pair of independent blades 22 in the form of flat bars having chisel-shaped cutting and digging edge portions 23. These blades 22 extend parallel to the front V edge of the body 7 and have in their backs longitudinal channels 24 into which said edge portion of the body 7 extends. The blades 22 are removably secured to the body 7 by rivets 25 that extend through aligned holes in said body and blades. A notch 26 is formed in the abutting ends of the blades 22 for the front end portion of the reinforcing plate 19.

Integral with each blade 22 are three chisel-shaped teeth 27. These teeth 27 are laterally spaced apart and leave sections of the cutting edge portions 23 of the blades 22 therebetween and at the point formed by said blades. The inner longitudinal edges of the teeth 27 merge with the edge portions 23 of the blades 22 and their outer longitudinal edges are vertical and slightly inclined rearwardly relative to the longitudinal center of the body 7 to afford relief from the cut soil and thus reduce drag by friction and suction. The actual cutting edges of the teeth 27 are slightly outwardly inclined from their inner to their outer longitudinal edges, which gives said teeth a shearing action.

A wearing bar 28, for the conveyor chain 13, is secured, by welding or otherwise, to the rear portion of the shovel body 7 at the bottom of the clearance notch 12. This wearing bar 28 is entirely outwardly of the inner side of the body 7 so as not to interfere with a cleaner which the shovel passes during its travel in an endless course.

When the shovel is working in clay or any other hard soil, the teeth 27 cut narrow strips from the soil in advance of the blades 22, and said blades thereafter cut the intervening strip and thus break up the soil as the same is loaded in the shovel.

The blades 22, when in need of sharpening, or when worn out or broken, may be readily removed from the body 7 simply by cutting the rivets 25. The old blades 22 may be again attached to the body 7 or new ones substituted therefor.

The drawings illustrate a commercial form of the invention, but it will be understood that the same is capable of certain modifications as to details of construction, arrangement and combination of parts within the scope of the invention herein disclosed.

What I claim is:

In a shovel of the class described, a body member, having secured to its front edge portion two blades having digging edges in the form of a wide V, laterally spaced teeth interposed in each blade and having cutting edges perpendicular to the longitudinal center of the body, the teeth of the two blades being arranged in pairs with their cutting edges aligned, the foremost pair of teeth being spaced rearwardly of the apex of the two digging edges of the blades, the cutting edges of the teeth and the digging edges of the blades being all in the same plane.

DANIEL F. PRZYBYLSKI.

REFERENCES CITED

The following references are of record in the file of this patent:

UNITED STATES PATENTS

| Number | Name | Date |
|---|---|---|
| 1,199,366 | French | Sept. 26, 1916 |
| 1,217,752 | Greimann | Feb. 27, 1917 |
| 1,959,847 | Van Buskirk | May 22, 1934 |
| 2,377,802 | Moon | June 5, 1945 |

FOREIGN PATENTS

| Number | Country | Date |
|---|---|---|
| 458,572 | Germany | Apr. 14, 1928 |
| 553,954 | Great Britain | June 11, 1943 |
| 660,446 | France | Feb. 19, 1929 |